Sept. 20, 1932.  C. J. MALM  1,878,953
PROCESS FOR CHANGING SOLUBILITY OF CELLULOSE ACETATE
Filed Dec. 12, 1928
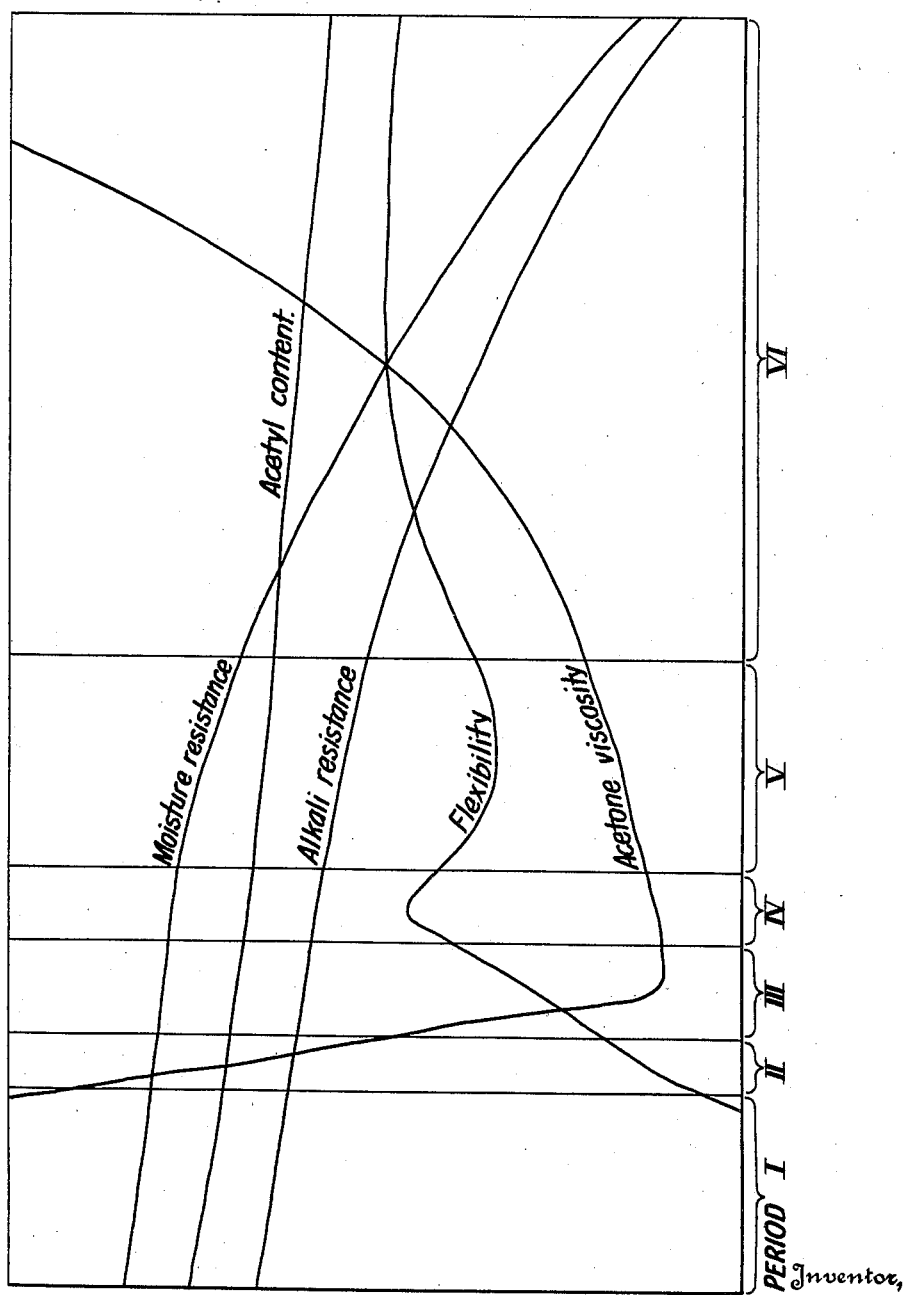
Inventor,
Carl J. Malm,
By Newton N. Perrins
Attorney Patented Sept. 20, 1932

1,878,953

UNITED STATES PATENT OFFICE

CARL J. MALM, OF ROCHESTER, NEW YORK, ASSIGNOR TO EASTMAN KODAK COMPANY, OF ROCHESTER, NEW YORK, A CORPORATION OF NEW YORK

PROCESS FOR CHANGING SOLUBILITY OF CELLULOSE ACETATE

Application filed December 12, 1928. Serial No. 325,597.

This invention relates to a process for the deacetylation, to any desired degree, of chloroform soluble cellulose acetate, cellulose triacetate, and to the product of such deacetylation.

Among the objects of the invention are the accomplishment of the deacetylation without degradation of the cellulose molecule; regulation of the rate of deacetylation so that it is uniform throughout the reaction mixture; accurate determination and control of the extent of the reaction so that it can be stopped at a precisely defined point; and the obtaining of products having qualities rendering them particularly desirable for selected uses, and particularly for photographic purposes. Other objects will appear hereinafter.

There are three essential steps in the manufacture of cellulose acetate. The first step comprises preparing the cellulose fibre as by treating it with reagents which so affect the fibre that subsequent acetylation is facilitated and more easily controlled. Examples of such pretreating methods are described in U. S. Patent 854,374, Mork, May 21, 1907. The second step covers the acetylation of the cellulose as with acetic acid, acetic anhydride and a catalyst; the reaction being ordinarily conducted at temperatures below 40° C., until a cellulose acetate is produced which has the desired solubility in chloroform. This step may be conducted in accordance with the disclosure in U. S. Patent 1,591,590, Webb & Malm, July 6, 1927. Both steps may be conducted in accordance with the patent to Gray and Staud, No. 1,683,347, granted Sept. 4, 1928.

Cellulose acetate of the chloroform soluble type produced as described above is not particularly suited for many industrial processes, such as the manufacture of photographic film or rayon. It has been found that products having solubility in acetone have many advantages. This is accomplished by the third step, hydrolysis or deacetylation, which may be carried out as described in U. S. Patent 1,635,026, Baybutt & Farrow, July 5, 1927. This process is also termed saponification.

It is well known in this art that if the second step cellulose acetate is hydrolyzed by the usual methods employed, it is very difficult for an operator consistently to obtain consecutive batches of partly deacetylated cellulose acetate that will meet the requirements of rigid manufacturing tolerances. I have found, on the other hand, that by using my hydrolyzing method the operator can consistently and accurately produce a product that will conform to those tolerances.

The prior art also teaches that the time of hydrolysis is affected by the temperature of the hydrolyzing bath. The higher the temperature the greater the rate of hydrolysis. It also teaches that continuance of the process at the higher temperatures customarily employed beyond a period such as 24 to 48 hours results in an inferior product, due to the breakdown or degradation of the cellulose molecule. It further teaches the use of relatively large quantities of mineral acid in the hydrolyzing bath. This results in a gradual degradation of the cellulose molecule as the deacetylation proceeds.

The possible reactions taking place in the hydrolyzing bath are as follows:

1. The splitting off of acetyl groups, which is termed deacetylation or saponification.
2. The decrease in molecular magnitude of the cellulose molecule, which may be termed degradation.

This degradation is indicated or measured by its tetrachlorethane viscosity, this being a known test described in Advisory Committee for Aeronautics, Dec. 1918, Report and Memorandum #568—see Figure 16, and being the tetrachlorethane viscosity of the material, after complete reacetylation, this being compared with the tetrachlorethane viscosity of the cellulose triacetate from which the deacetylated material was produced. It may also be indicated or measured by its cupro-ammonium viscosity, this being a known test described in Joyner, J. C. S., London, vol. 121, page 1523, and being the cupro-ammonium viscosity of the material after complete de-esterification, this being compared with the cupro-ammonium viscosity of the cellulose triacetate, after complete de-esterification, from which it was produced.

The optimum result in the conversion of cellulose acetate to an acetone soluble form for many purposes, and particularly for photographic purposes, is attained when the deacetylation is so conducted as to preclude simultaneous degradation of the cellulose molecule. As noted above, in all previous processes, saponification or deacetylation has been accompanied by a marked degradation.

The following factors affect the extent and the actual and relative rates of these reactions:
1. Temperature.
2. Concentration of mineral acid.
3. Ratio of solvent to solute.
4. Time.

I have found that it is possible to attain the desired optimum result by suitable selection of these factors and particularly by so selecting them that the rate of deacetylation is low and consequently the periods of time required for the reaction are much greater than has hitherto been employed.

Favorable conditions for attaining this result are found in the choice of low temperature or low mineral acid concentration or both.

I have found that the hydrolyzing bath best suited to carry out my process may consist of an excess of acetic acid over the cellulose acetate contained therein of approximately 700%. A smaller or larger excess, however, would not appreciably affect the results although I prefer to use the above percentage. The mineral acid catalyst has proven very satisfactory and is preferably used at an extremely low concentration, say from $\frac{1}{10}$ of 1% to not more than 1%. If other catalysts are to be used such as phenol sulfonic acid, the acid sulfites, or the sulfur chlorides,—the ratio of their catalytic reactivity to the mineral acids, known to the experts in this art, will give the correct proportions.

I will now describe several examples of my invention but it will be understood that I am not limited thereby except as indicated in the appended claims.

*Example 1.*—To 580 parts of solution, consisting of 80 parts by weight of cellulose triacetate (44.8% acetyl) obtained from the second step, as described in the Gray & Staud patent, 500 parts of substantially glacial acetic acid, and approximately 1 part of sulfuric acid and 3 parts of phosphoric acid, is added a mixture of 37 parts of water and 60 parts of glacial acetic acid. There results a solution of 80 parts of cellulose triacetate in 597 parts of 94% acetic acid with less than $\frac{1}{5}$ of 1% of sulfuric acid and less than $\frac{3}{5}$ of 1% of phosphoric acid. This mixture is maintained at a temperature of 70° F. for at least 15 days and then precipitated into water or dilute acid; the product obtained has maximum acetyl content of 41.5%.

The reaction may run for from fifteen to a hundred days, during which time the deacetylation will proceed at a substantially uniform rate, and there will be no perceptible degradation even at the end of this prolonged period. This I consider a very remarkable and unexpected result.

The physical and chemical properties of the acetate are found to vary in a non-uniform manner throughout the reaction and by a determination of these properties it is possible to obtain an acetate having the desired properties or combination of properties by stopping the reaction at the point where these are most closely approximated. Because of the low rate of change of the properties it is possible to select with a very high degree of exactness the precise point at which to stop the reaction to obtain the desired properties.

By way of illustration, the resistance to moisture at the beginning is extremely high and this gradually decreases at an increasing rate through the reaction until the acetate approaches or reaches water solubility. It is still very high after thirty-five days and at the end of the fiftieth day is moderately high.

The resistance to deacetylation in alkali is high at the start and also slowly decreases.

The solubility in acetone is inappreciable until about the fifteenth day. At this time the acetone viscosity is high and falls off very rapidly, reaching a minimum between the twentieth and twenty-fifth day and then rising at a substantially uniform rate being moderately high at the fiftieth day, and increasing very rapidly thereafter.

The flexibility, as determined from a film coated from a solution of the acetate in acetone, rises from zero at fifteen days to a very sharp maximum at about thirty days, after which it drops somewhat passing through a minimum of moderate flexibility at about forty days, and thereafter rising and remaining above its first maximum.

The whole period may, for convenience for purposes of discussion, be divided up into periods, but it is to be understood that there are no sharp breaks in the process nor in the properties of the products.

In the above example, these periods may be defined as follows:

Period I. First to fifteenth day. The acetyl content is gradually reduced from 44.8% to 41.5%. This period is of little interest for the purposes of this application, but it may be stated that if an attempt is made to shorten it by raising the temperature to, say, 120° F. there is noticeable molecular degradation.

Period II. Fifteenth to twentieth day. During this period the acetyl content falls from 41.5% to 41%; the resistance to moisture and to deacetylation in alkali remain very high, though decreasing very slightly, the acetone viscosity is high, but falling rapidly.

Period III. Twentieth to twenty-seventh day. The acetyl content falls from 41% to 40.5%; the resistance to moisture and to deacetylation in alkali remain very high though decreasing slightly, acetone viscosity passes through a minimum, flexibility increases rapidly.

Period IV. Twenty-seventh to thirty-third day. Acetyl content falls from 40.5 to 40%. Resistance to moisture and alkali continues high but decreasing; acetone viscosity is low but rising steadily, flexibility is high and passes through a maximum.

Period V. Thirty-third to fiftieth day. Acetyl content falls from 40% to 38%, resistance to moisture and alkali fall with increasing rapidity but are moderately high. Acetone viscosity rises steadily and flexibility becomes somewhat less in the first part of the period and then rises somewhat, being moderately high throughout.

Period VI. Beyond fiftieth day. Acetyl content decreases, being about 34% at one hundred days. Resistance to moisture and alkali decrease rapidly. Acetone viscosity rapidly increases, becoming extremely high. Flexibility increases and then remains very high.

*Example 2.*—This is identical with example 1, except that a temperature of 80° F. is maintained. In this case the points corresponding to the ends of the periods outlined above are eleven days, thirteen days, fourteen and one-half days, seventeen days, twenty days and forty days.

*Example 3.*—This differs from the preceding in that a temperature of 90° F. is maintained. The points corresponding to the ends of the described periods are approximately four days, five and one-half days, seven days, nine and one-half days, fourteen days, twenty-five days.

*Example 4.*—This differs from the preceding in that a temperature of 100° F. is maintained. The points corresponding to the ends of the described periods are approximately 80 hours, 100 hours, 110 hours, 160 hours, 200 hours, and 350 hours.

*Example 5.*—The hydrolysis is conducted in the same manner as in any one of the above examples. The starting material, however, is a chloroform soluble acetate made by a method using only sulfuric acid as a catalyst, and hence the phosphoric acid mentioned in Example 1 would not be present. The proportions would otherwise be the same.

From the description of my invention contained in this specification, it will be observed that the greatest range of usefulness of my novel cellulose acetate lies within the range of periods II to VI and that, for probably a majority of purposes, the hydrolysis of the cellulose acetate may conveniently be stopped some time in periods III, IV and V. I have found that a cellulose acetate prepared in accordance with my invention and having a "precipitation value" ranging from approximately 85% to approximately 98% and which is soluble in acetone, has the greatest range of utility for the purposes specified herein. For some purposes, an acetate having a precipitation value ranging between 90% to 96% is satisfactory. As above explained, the hydrolysis may be stopped at any desired period and when the desired precipitation value is reached. This precipitation value is the percentage of cellulose acetate, which, from an acetone solution thereof, will precipitate in a mixture of 40% water and 60% acetone by value.

In order that the method of determining this precipitation value may be more thoroughly understood, the exact method of determining it is described as follows:

Five grams of the dry cellulose acetate are accurately weighed and placed in a wide mouth 12 oz. bottle. To this are added 100 cc. of acetone (commercial grade of 99% or better), and the mixture is stirred until homogeneous. (The bottle should be closed during the stirring with a rubber stopper fitted with a shaft for the stirrer). To this dope is added slowly from a pipette and with thorough stirring, 150 cc. of a mixture consisting of 2 parts of distilled water and 1 part acetone by volume. Care should be taken to keep the solvents and mixtures at 20° C. wherever volumes are being measured.

At the end of the addition of the acetone-water mixture, a mixture is obtained containing 40% water by volume (neglecting contraction) in which is suspended the precipitated acetate. This is allowed to stand for 12 hours at 20° C. 25 cc. of the clearest portion (supernatant solution) are removed with a pipette. At the end of this time precipitation has reached equilibrium and proceeds no further, and during the same time settling of the precipitate occurs. This 25 cc. is centrifuged in stoppered bottles at high speed until the liquid is perfectly clear. Exactly 5 cc. of the clear liquid are removed with a pipette and evaporated to dryness on a tared watch glass. If W is the weight of the residue in grams the precipitation value which equals the per cent acetate precipitated, $$= 100 - W \times \frac{250}{5} \times \frac{1}{5} \times 100$$

$$= 100 - 1000W$$

In the claims wherein precipitation value is referred to, it is intended that the value defined shall be one determined by the foregoing method.

If a high percentage of mineral acid is used in the deacetylation bath, the maintained temperature of 100° F. will result in degradation. As the percentage is increased, the operating temperature must necessarily be lower, and at considerable concentrations must be well below 50° F. to prevent degradation. The time at these lower temperatures will be so prolonged, that the process, while operative, is not well adapted for commercial exploitation.

It is, in general, an objection to this process that it requires a large expenditure for suitable receptacles for the storage of the material during the reaction. The advantages derived through accurate control, which result in uniform final products, more than offset, however, this disadvantage.

In the accompanying drawing is shown a chart illustrating on purely arbitrary scales the changes in the properties during the continuance of the reaction. This is understood to be by way of example. Obviously it is impossible to place quantitative values on the graph or diagram as quantitative conditions are changed by a change in the temperature used. However the curves shown will be of the same order for each particular example of the process. The diagram is to be understood as illustrative and not absolute.

If the diagram is taken as illustrative of Example 1, the periods are as disclosed on pages 7 and 8. As shown on the diagram the acetyl content decreases sharply the first period and more gradually in the subsequent periods, the moisture resistance decreases markedly after the fourth period, the acetone viscosity decreases abruptly in the first three periods, rises gradually during the fourth and fifth periods and then abruptly during the sixth period. In the diagram as applied to Example 1 the six periods cover a period of 100 days, as to Example II, 40 days, etc. Obviously certain of the curves may be shifted in relative position or in degree by variation in the initial triacetate, proportions of the initial constituents of the bath, the particular acid used and other details of the process as actually carried out. This may indeed be desirable and may furnish a means to control the particular qualities that may be desired for special purposes.

For instance, in cut sheets to be used for X-ray and portrait film and the like where flatness is most desirable, this property has been found to be a concommitant of high moisture resistance, and for cellulose acetate to be used for this purpose, the reaction would be stopped in Periods III or IV where this value is high and where the acetone viscosity is low, permitting easy coating.

For motion picture film, particularly for projection purposes, where flexibility is a prime consideration, Periods IV, V, VI, are indicated as the best points, and particularly IV, since the film can then be easily formed and also has high resistance to the photographic baths.

For artifical silk, the particular point to be selected would be determined by the intended use. Since existing thread-forming machines are designed particularly for dope of high viscosity, Periods II and VI are indicated. Period VI is also indicated if dyeing is intended since the acetate is then most permeable. If, however, durability in wear and washing is important, Periods II, III, and IV are indicated.

For lacquers and varnish for general use or for coating motion picture film, where high impermeability and hardness are desirable, Sections III and IV would be selected, while, for anti-static backing for motion picture film, Section VI would furnish the most desirable qualities. Sizes for paper could also be made from the material from Period VI, while, for plastic work and for coating paper with an acetate layer, Periods V or VI could be selected.

Although I have included a full discussion of the results at the various periods, some naturally are of greater value than others and in this application the products resulting from stopping the reaction at Periods III, IV, and V are especially emphasized.

It is also to be noted that in the preferred process in which the pretreatment and acetylation are carried out in accordance with the Gray and Staud patent, there is present in all the steps at least as much phosphoric acid as there is sulfuric acid.

Sheeting containing or prepared from the cellulose acetate herein described and claimed is not a part of my invention but is the invention of Albert F. Sulzer as set forth and claimed in Patent No. 1,833,136 granted November 24, 1931. Similarly, artificial silk or filaments containing or prepared from the cellulose acetate herein described and claimed is not my invention but is the invention of Paul C. Seel as set forth and claimed in his application, Serial No. 416,286, filed December 24, 1929.

Having thus described my invention, what I claim as new and desire to secure by Leters Patent is:

1. The method of treating cellulose triacetate having an acetyl content of the order of 44.8% until said acetyl content is of the order to 40% that comprises submitting it to a hydrolyzing bath comprising an excess of acetic acid and water, said bath containing sulfuric acid and phosphoric acid, the amount of the sulfuric acid being of the order of $\frac{1}{5}$ of 1% and the phosphoric acid being of the order of $\frac{3}{5}$ of 1% of the bath.

2. The method of treating cellulose triacetate having an acetyl content of the order of 44.8% until said acetyl content is of the order of 40% that comprises submitting it to a hydrolyzing bath comprising an excess of acetic acid and water, said bath containing sulfuric acid and phosphoric, the amount of the sulfuric acid being of the order of $\frac{3}{5}$ of 1% of the bath, and at a temperature not over 105° F. for a period of over 5 days.

3. In a process for making cellulose acetate including the acetylation of cellulose in the presence of sulfuric and phosphoric acids, the method of deacetylating the triacetate thus formed that comprises the use of a deacetylating bath containing sulfuric and phosphoric acids and in which the total mineral acid concentration is less than one percent and submitting the triacetate to such bath for a period of time exceeding 4 days at a temperature less than 105° F.

4. In a process for making cellulose acetate including the acetylation of cellulose in the presence of sulfuric and phosphoric acids, the method of hydrolyzing the triacetate thus formed that comprises the diluting of the acetylating bath to destroy the acetic anhydride, the mineral acid concentration being less than 1% and the continuance of the hydrolyzation at a temperature not greater than 105° F. for at least five days.

5. A process of making acetate by the successive steps of pretreatment, acetylation and hydrolyzation characterized in that there are present sulfuric acid and phosphoric acid during each of the three steps and that in the hydrolyzation steps the mineral acid concentration of the bath is less than one percent and that hydrolyzation is continued for at least five days at a temperature not exceeding 105° F.

6. A process of making cellulose acetate by the successive steps of pretreatment, acetylation and hydrolyzation characterized in that there are present sulfuric and phosphoric acids during each of the three steps, the amount of phosphoric acid being at least as great as the amount of sulfuric acid and the hydrolysis being conducted for at least four days.

7. A process of making cellulose acetate by the successive steps of pretreatment, acetylation and hydrolyzation characterized in that there are present sulfuric and phosphoric acids during each of the three steps, the amount of phosphoric acid being at least as great as the amount of sulfuric acid, and that hydrolyzation is continued for at least five days at a temperature not exceeding 105° F.

8. Cellulose acetate which is soluble in acetone and which has a precipitation value ranging between 85% and 98%.

9. Cellulose acetate which is soluble in acetone and which has a precipitation value ranging between 90% to 96%.

10. A process of de-acetylating a substantially fully esterified cellulose acetate which comprises hydrolyzing the acetate in a bath containing from $\frac{1}{10}$% to 1% of a hydrolyzing catalyst for a period exceeding 6 days.

11. A process of de-acetylating a fully esterified cellulose acetate which comprises hydrolyzing the acetate in an aqueous acid bath containing a fraction of 1% of a hydrolyzing catalyst for a period exceeding 6 days.

12. A process of de-acetylating a fully esterified cellulose acetate which comprises hydrolyzing the acetate in a bath containing an appreciable amount but less than 1% of sulfuric acid for a period exceeding 6 days.

13. A process of de-acetylating a fully esterified cellulose acetate which comprises hydrolyzing the acetate in a bath containing an appreciable amount but not more than $\frac{3}{5}$ of 1% of sulfuric acid for a period exceeding 6 days.

14. A process of de-acetylating a substantially fully esterified cellulose acetate which comprises treating the acetate with a hydrolyzing bath until it has a precipitation value of 85–98%.

15. A process of de-acetylating a substantially fully esterified cellulose acetate which comprises treating the acetate with a hydrolyzing bath until it has a precipitation value of 90–96%.

Signed at Rochester, New York this 4th day of December 1928.

CARL J. MALM.

CERTIFICATE OF CORRECTION.

Patent No. 1,878,953. September 20, 1932.

CARL J. MALM.

It is hereby certified that error appears in the printed specification of the above numbered patent requiring correction as follows: Page 3, line 80, for "value" read "volume"; page 4, line 116, claim 1, for "to" first occurrence, read "of"; and that the said Letters Patent should be read with these corrections therein that the same may conform to the record of the case in the Patent Office.

Signed and sealed this 6th day of December, A. D. 1932.

M. J. Moore,
Acting Commissioner of Patents.

(Seal)